United States Patent
Numrich et al.

(10) Patent No.: US 8,158,709 B2
(45) Date of Patent: Apr. 17, 2012

(54) PLASTIC MIXTURES COMPRISING THERMOPLASTIC POLYURETHANE (TPU) AND IMPACT-RESISTANT POLY(METH)ACRYLATE

(75) Inventors: Uwe Numrich, Gross-Zimmern (DE); Peter Battenhausen, Brachttal-Udenhain (DE); Guenther Dickhaut, Riedstadt (DE); Claude Guenanten, Darmstadt (DE)

(73) Assignee: Evonik Roehm GmbH, Darmstadt (DE)

(*) Notice: Subject to any disclaimer, the term of this patent is extended or adjusted under 35 U.S.C. 154(b) by 0 days.

(21) Appl. No.: 12/919,166

(22) PCT Filed: Feb. 27, 2009

(86) PCT No.: PCT/EP2009/052377
§ 371 (c)(1),
(2), (4) Date: Aug. 24, 2010

(87) PCT Pub. No.: WO2009/135702
PCT Pub. Date: Nov. 12, 2009

(65) Prior Publication Data
US 2011/0015334 A1    Jan. 20, 2011

(30) Foreign Application Priority Data
May 6, 2008 (DE) .................. 10 2008 001 596

(51) Int. Cl.
C08F 8/30 (2006.01)
C08F 283/04 (2006.01)
C08G 18/08 (2006.01)
C08L 75/00 (2006.01)

(52) U.S. Cl. .................. 524/507; 525/123; 525/455

(58) Field of Classification Search .................. 524/507; 525/123, 455
See application file for complete search history.

(56) References Cited

U.S. PATENT DOCUMENTS

| | | | |
|---|---|---|---|
| 5,216,082 A | 6/1993 | Heil et al. | |
| 5,539,053 A | 7/1996 | Avenel | |
| 5,739,196 A * | 4/1998 | Jenkins et al. | 524/460 |
| 2009/0105399 A1 | 4/2009 | Schultes et al. | |

FOREIGN PATENT DOCUMENTS

| | | |
|---|---|---|
| EP | 0 272 975 | 6/1988 |
| GB | 2 226 324 | 6/1990 |
| JP | 4-270717 | 9/1992 |
| WO | WO 2007/057242 A1 | 5/2007 |

OTHER PUBLICATIONS

Office Action issued May 11, 2011 in Japan Application No. 2011-507846 (German Translation).

* cited by examiner

Primary Examiner — Patrick Niland
(74) Attorney, Agent, or Firm — Oblon, Spivak, McClelland, Maier & Neustadt, L.L.P.

(57) ABSTRACT

The present invention relates to a plastics mixture comprising at least one thermoplastic polyurethane A) and at least one impact-modified poly(meth)acrylate B), where the impact-modified poly(meth)acrylate comprises a hard phase whose glass transition temperature is at least 70° C. and a tough phase whose glass transition temperature is at most −10° C., the average particle size of the tough phase is at most 130 nm, and at least a portion of the tough phase has covalent linkage to the hard phase.

22 Claims, No Drawings

PLASTIC MIXTURES COMPRISING THERMOPLASTIC POLYURETHANE (TPU) AND IMPACT-RESISTANT POLY(METH)ACRYLATE

The present invention relates to plastics mixtures which comprise a thermoplastic polyurethane (TPU) and an impact-resistant poly(meth)acrylate, and to processes for the production of these mixtures. The present invention further relates to mouldings which comprise these plastics mixtures.

Poly(meth)acrylates, in particular polymethyl methacrylates, are plastics with an excellent property profile. However, the low notched impact resistance of these plastics is a disadvantage. To improve this property, polymethyl methacrylates are provided with impact modifiers which are well known per se. These impact-modified polymethyl methacrylates are described inter alia in EP-A 0 113 924, EP-A 0 522 351, EP-A 0 465 049 and EP-A 0 683 028. However, many of these compositions exhibit a marked tendency toward what is known as stress whitening. Stress whitening is clouding of the plastic which arises on exposure to flexural stress or on impact. An impact-resistant plastics moulding composition based on methyl (meth)acrylate with a low level of stress whitening is described in DE-A-38 42 796.

There are moreover known plastics mixtures which comprise poly(meth)acrylates and polyurethanes. This mixture likewise gives a plastic with improved notched impact resistance. Interpenetrating networks based on mixtures of poly(meth)acrylates and polyurethanes are described inter alia in U.S. Pat. No. 3,700,752; U.S. Pat. No. 5,539,053 and EP-A-0 272 975. A disadvantage is that it is often impossible to process these plastics using thermoplastic methods.

The publication WO 2007/057242 moreover discloses transparent plastics mixtures which comprise thermoplastic polyurethane and polymethyl methacrylate. These plastics indeed exhibit a good property profile. However, there is a continuing need to make further improvements in the properties of this plastic. By way of example, these plastics exhibit crack propagation which fails to comply with many requirements. The mixtures described in WO 2007/057242 moreover have a tendency towards stress whitening.

In the light of the prior art, an object of the present invention was then to provide a plastic which has an improved property profile. In particular, a moulding comprising a plastic should exhibit a particularly low level of crack propagation. This plastic should moreover be capable of serving for the production of mouldings which have little tendency towards stress whitening. The plastic should moreover be capable of processing to give mouldings with excellent mechanical properties, for example with high tensile modulus and with high tensile strain at break.

Another object of the invention consisted in providing a plastic which can be used for the production of mouldings with high notched impact resistance. This property should also be retained at low temperatures.

The plastic should in particular be capable of processing by thermoplastic methods and exhibit high weathering resistance, in particular high UV resistance. A further object of the present invention is moreover, to provide a plastic and, respectively, a moulding obtainable therefrom, with high gloss and high transparency. A moulding comprising this plastic should moreover be printable by conventional processes.

This plastic should be obtainable at minimum cost.

A plastics mixture with all of the features of Patent Claim 1 achieves these objects, and also achieves other objects which, although not explicitly mentioned, are nevertheless readily derivable or deducible from the circumstances discussed in this introduction. Useful embodiments of the plastics mixtures of the invention are protected by the dependent claims which refer back to claim 1. With regard to the process for the production of these plastics, and of a moulding, the subject matter of Claims 19 and, respectively, 20 achieves the underlying object.

The present invention accordingly provides a plastics mixture comprising at least one thermoplastic polyurethane A) and at least one impact-modified poly(meth)acrylate B), characterized in that the impact-modified poly(meth)acrylate B) comprises a hard phase whose glass transition temperature is at least 70° C. and a tough phase whose glass transition temperature is at most −10° C., the average particle size of the tough phase is at most 130 nm, and at least a portion of the tough phase has covalent linkage to the hard phase.

This approach is successful, in a manner which is not foreseeable, in providing a plastic with an improved property profile. The plastics mixture of the present invention can in particular be processed to give mouldings which exhibit a particularly low level of crack propagation and little tendency towards stress whitening. Mouldings which comprise a plastics mixture of the invention moreover have excellent mechanical properties, for example high tensile modulus, high tensile strain at break and high notched impact resistance. Surprisingly, these properties are retained even at low temperatures.

The plastics mixture of the present invention can be processed by thermoplastic methods and exhibits high weathering resistance, in particular high UV resistance. According to one preferred embodiment, a plastics mixture of the invention can be processed to give foils or other mouldings which have high gloss and high transparency. A moulding using a plastics mixture of the present invention can moreover be printed by conventional processes.

The plastics mixture of the invention can be produced cost-effectively, and the production or processing of the plastics mixture involves no unacceptable risks to the environment or to health.

A plastics mixture of the invention comprises at least one thermoplastic polyurethane A). Polyurethanes (PU) are polymers whose macromolecules involve linkage of the repeat units by urethane groups —NH—CO—O—. Polyurethanes are generally obtained via polyaddition starting from di- or polyhydric alcohols and from isocyanates as follows:

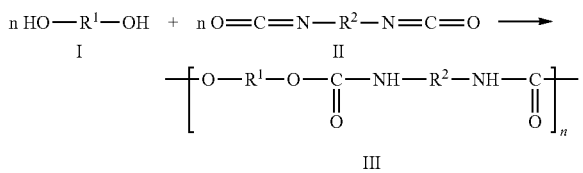

$R^1$ and $R^2$ here can be low-molecular-weight aliphatic or aromatic groups, or these groups themselves can be polymeric. Industrially important PUs are produced from polyester- and/or polyetherdiols and, for example, toulene 2,4- or 2,6-diisocyanate (TDI, $R^2=C_6H_3—CH_3$), 4,4'-methylenedi(phenyl isocyanate) (MDI, $R^2=C_6H_4—CH_2—C_6H_4$), 4,4'-methylenedicyclohexyl isocyanate (HMDI, $R^2 =C_6H_{10}—CH_2—C_6H_4$) or hexamethylene diisocyanate [HDI, $R^2=(CH_2)_6$]. The synthesis of the PUs can generally take place without use of solvent or in inert organic solvents. Catalysts often used for the polyaddition reaction are certain amines or organotin compounds. Use of bifunctional alcohols and isocyanates in equimolar ratios leads to linear PUs. Branched and crosslinked products arise if higher-functionality starting materials are used concomitantly or else if there is an excess of isocyanate, in which case isocyanate groups react with the urethane groups or urea groups to form allophanate or, respectively, biuret structures, for example as follows:

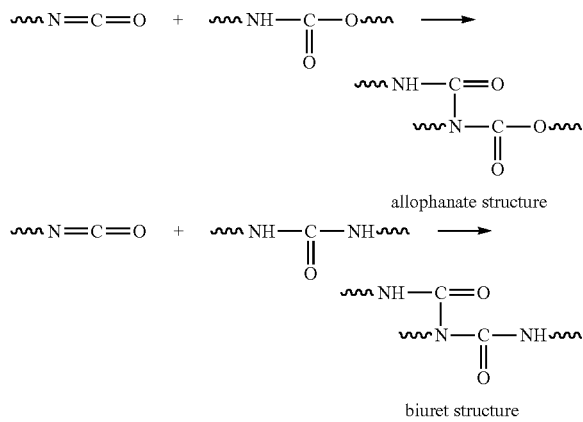

As a function of the selection and stoichiometric ratio of the starting materials, PUs with very different mechanical properties are accordingly produced, and are used inter alia as constituents of adhesives and lacquers (P resins), as ionomers, as thermoplastic material for bearing parts, pulleys, tyres, or rollers, and are used in a wide variety of ways as elastomers of varying levels of hardness in the form of fibres (elastic fibres, the abbreviation used for these elastane or spandex fibres being PUE), or in the form of polyether- or polyesterurethane rubber (abbreviated to EU and, respectively, AU according to DIN ISO 1629: 1981-10); see also polyurethane rubbers, polyurethane lacquers, and polyurethane resins. PUs are moreover described inter alia in Kunststoffe 85, 1616 (1995), Batzer 3, 158-170 Batzer 3, 158-170; Domininghaus (5th), pp. 1140 ff.; Encycl. Polym. Sci. Eng. 13, 243-303; Houben-Weyl E 20/2, 1561-1721.

The term "thermoplastic" is well known to persons skilled in the art, and covers plastics which inter alia can be processed by extrusion processes and/or injection-moulding processes.

The thermoplastic polyurethane A) used preferably comprises a product having a high proportion of aliphatic units. These polyurethanes A) preferably comprise at most 10% by weight, particularly preferably at most 5% by weight, of repeat units which have aromatic groups.

According to the invention, a plastics mixture comprises at least one impact-modified poly(meth)acrylate B). For the purposes of the present invention, the term poly(meth)acrylate means a polymer obtainable via free-radical polymerization of (meth)acrylates. Preferred impact-modified poly (meth)acrylates B) comprise at least 40% by weight, particularly preferably at least 60% by weight and very particularly preferably at least 80% by weight, of repeat units derived from (meth)acrylates. The poly(meth)acrylates can preferably be obtained via free-radical polymerization. Accordingly, the proportion by weight of repeat units can be obtained from the proportions by weight of corresponding monomers used for the production of the polymers.

The expression (meth)acrylates comprises methacrylates and acrylates, and also mixtures of the two. These monomers are well known. They include, inter alia, (meth)acrylates derived from saturated alcohols, for example methyl (meth) acrylate, ethyl(meth)acrylate, propyl(meth)acrylate, n-butyl (meth)acrylate, tert-butyl(meth)acrylate, pentyl(meth)acrylate and 2-ethylhexyl (meth)acrylate; (meth)acrylates derived from unsaturated alcohols, for example oleyl(meth)acrylate, 2-propynyl(meth)acrylate, allyl(meth)acrylate, vinyl (meth) acrylate; aryl(meth)acrylates, such as benzyl(meth)acrylate or phenyl (meth)acrylate, where in each case the aryl moieties may be unsubstituted or have up to four substituents; cycloalkyl(meth)acrylates, such as 3-vinylcyclohexyl(meth) acrylate, bornyl(meth)acrylate; hydroxyalkyl (meth)acrylates, such as 3-hydroxypropyl(meth)acrylate, 3,4-dihydroxybutyl (meth)acrylate, 2-hydroxyethyl(meth)acrylate, 2-hydroxypropyl(meth)acrylate; glycol di(meth)acrylates, such as 1,4-butanediol (meth)acrylate, (meth)acrylates of ether alcohols, for example tetrahydrofurfuryl(meth)acrylate, vinyloxyethoxyethyl(meth)acrylate; amides and nitriles of (meth)acrylic acid, for example N-(3-dimethylaminopropyl)(meth)acrylamide, N-(diethylphosphono)(meth)acrylamide, 1-methacryloylamido-2-methyl-2-propanol; sulphur-containing methacrylates, such as ethylsulphinylethyl (meth) acrylate, 4-thiocyanatobutyl(meth)acrylate, ethylsulphonylethyl (meth)acrylate, thiocyanatomethyl (meth)acrylate, methylsulphinylmethyl (meth)acrylate, bis ((meth)acryloyloxyethyl) sulphide; polyfunctional (meth) acrylates, such as trimethyloylpropane tri(meth)acrylate.

A poly(meth)acrylate B) that can be used according to the invention can have, alongside the (meth)acrylates, repeat units derived from comonomers.

Among these are, inter alia, 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as monochlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, such as maleic anhydride, methylmaleic anhydride, maleimide, methylmaleimide; and dienes, such as divinylbenzene.

The amount of these comonomers generally used for the production of the poly(meth)acrylates B) is from 0 to 60% by weight, preferably from 0 to 40% by weight and particularly preferably from 0 to 20% by weight, based on the weight of the monomers, and the compounds can be used individually or in the form of a mixture.

The poly(meth)acrylate B) that can be used according to the invention has a hard phase whose glass transition temperature is at least 70° C. and a tough phase whose glass transition temperature is at most −10° C., and the average particle size of the tough phase here is at most 130 nm, and at least a portion of the tough phase has covalent linkage to the hard phase. Accordingly, the tough phase is present in particle form in the plastics mixture, and the continuous phase surrounding these particles, inter alia the hard phase, can comprise further poly(meth)acrylate and/or thermoplastic polyurethane. The diameter of the particles here is smaller than or equal to 130 nm, and preferred plastics mixtures here have a tough phase whose particle size is smaller than or equal to 70 nm, the particle size being based on the weight-average diameter. The polydispersity of the tough phase present in the plastics mixture is preferably 0.5 or less. It is particularly preferable that the polydispersity is smaller than or equal to 0.2. A high level of uniformity of the tough-phase particles leads inter alia to particularly transparent plastics.

The glass transition temperature of the tough phase of the impact-modified poly(meth)acrylate B) to be used according to the invention is at most −10° C. The glass transition temperature of the tough phase is preferably below or equal to −20° C.

The glass transition temperature can be influenced by way of the nature and the proportion of the monomers used for the production of the tough phase. The glass transition temperature Tg of the polymer here can be determined in a known manner by means of differential scanning calorimetry (DSC). The glass transition temperature Tg can also be approximated by means of the Fox equation. According to Fox T. G., Bull. Am. Physics Soc. 1, 3, page 123 (1956):

$$\frac{1}{Tg} = \frac{x_1}{Tg_1} + \frac{x_2}{Tg_2} + \ldots + \frac{x_n}{Tg_n}$$

where $x_n$ is the mass fraction (% by weight/100) of the monomer n, and $Tg_n$ is the glass transition temperature in Kelvin of the homopolymer of the monomer n. The person skilled in the art can find further useful information in Polymer Handbook 2nd Edition, J. Wiley & Sons, New York (1975), which states Tg values for the most familiar homopolymers.

The tough phase of the impact-modified poly(meth)acrylate B) can advantageously have at least 50% by weight, preferably at least 60% by weight, of repeat units derived from an alkyl acrylate having from 1 to 6 carbon atoms, based on the weight of the tough phase of the impact-modified poly(meth)acrylate B). Among these monomers to be used with preference are in particular methyl acrylate, ethyl acrylate, propyl acrylate, n-butyl acrylate, tert-butyl acrylate, pentyl acrylate and hexyl acrylate, particular preference being given here to butyl acrylate.

According to the invention, at least one portion of the tough phase has covalent linkage to the hard phase. It is advantageous that at least 5% by weight, preferably at least 15% by weight and particularly preferably at least 20% by weight, of the hard phase has covalent linkage to the tough phase. Covalent linkage of the tough phase to the hard phase can in particular be achieved via use of crosslinking monomers during the production of the tough phase of the impact-modified poly(meth)acrylates B). Crosslinking monomers are compounds which have two, three or more groups which can undergo free-radical polymerization.

Among these are in particular (meth)acrylates having two double bonds, e.g. (meth)acrylates which derive from unsaturated alcohols, e.g. 2-propynyl (meth)acrylate, allyl(meth)acrylate, vinyl(meth)acrylate, and also (meth)acrylates which derive from diols or from polyhydric alcohols, e.g. glycol di(meth)acrylates, such as ethylene glycol di(meth)acrylate, diethylene glycol di(meth)acrylate, triethylene glycol di(meth)acrylate, tetra- and polyethylene glycol di(meth)acrylate, 1,3-butanediol (meth)acrylate, 1,4-butanediol (meth)acrylate, 1,6-hexanediol di(meth)acrylate, glycerol di(meth)acrylate and diurethane dimethacrylate; (meth)acrylates having three or more double bonds, e.g. glycerol tri(meth)acrylate, trimethylolpropane tri(meth)acrylate, pentaerythritol tetra(meth)acrylate and dipentaerythritol penta(meth)acrylate.

A distinction is often drawn between crosslinking agents in the strict sense and graft-linking agents. The crosslinking agents in the strict sense include monomers which comprise at least two acrylic or methacrylic moieties. Graft-linking agents are monomers which comprise not only an acrylic or methacrylic moiety but also an ethylenically unsaturated group having markedly less tendency towards polymerization, generally an allyl group.

The tough phase preferably comprises at least 0.5% by weight, preferably at least 1% by weight, based on the weight of the tough phase, of repeat units derived from crosslinking monomers. Preference is given here to graft-linking agents or to monomers whose molecule comprises three or more acrylic or methacrylic groups. The proportion of repeat units derived from graft-linking agents or from monomers whose molecule comprises three or more acrylic or methacrylic groups is particularly preferably in the range from 1 to 4% by weight, based on the weight of the tough phase. The proportion of monomers whose molecule comprises two (meth)acrylic groups can advantageously be from 0.05 to 2% by weight in the form of repeat units in the tough phase.

Since the repeat units by way of which the tough phase is covalently linked to the hard phase derive from monomers used during the production of the tough phase, the weight of these repeat units is counted as part of the tough phase.

Preferred tough phases can comprise not only the repeat units described above derived from alkyl acrylate having from 1 to 6 carbon atoms and, respectively, from crosslinking monomers, but also repeat units derived from further monomers. Among these monomers are in particular the (meth)acrylates described above, differing from the alkyl acrylates having from 1 to 6 carbon atoms and, respectively, from the crosslinking monomers.

The impact-modified poly(meth)acrylate B) comprises not only the tough phase but also at least one hard phase covalently bonded to the tough phase. The glass transition temperature of the hard phase is at least 70° C., preferably at least 80° C. As described above, the glass transition temperature can be adjusted via the selection of the monomers for the production of the hard phase.

The hard phase of the impact-modified poly(meth)acrylate B) preferably comprises at least 80% by weight, particularly preferably at least 90% by weight, of repeat units derived from methyl methacrylate, based on the weight of the hard phase of the impact-modified poly(meth)acrylate B). The hard phase of preferred impact-modified poly(meth)acrylates B) can comprise not only methyl methacrylate but also up to 20% by weight of comonomers.

According to one advantageous embodiment of the plastics mixture of the invention, the ratio by weight of hard phase bonded covalently to the tough phase to tough phase of the impact-modified poly(meth)acrylate B) can be at least 1:10, particularly preferably at least 1:5 and very particularly preferably at least 1:1.

The impact-modified poly(meth)acrylate B) advantageously has at most 0.1% by weight, particularly preferably at most 0.05% by weight, of water-soluble constituents, based on the weight of the impact-modified poly(meth)acrylate B). A low proportion of water-soluble constituents can in particular be achieved via the work-up process during the production of the impact-modified poly(meth)acrylate B). This measure can in particular reduce susceptibility to clouding on exposure to moisture.

Impact-modified poly(meth)acrylates B) to be used with preference have a low proportion of aromatic groups, in particular of styrene. Surprisingly, weathering resistance can thus be improved. Particularly advantageous impact-modified poly(meth)acrylates B) are those which have at most 10% by weight, particularly preferably at most 2% by weight and very particularly preferably at most 0.5% by weight, of repeat units derived from monomers having aromatic groups, in particular from styrene monomers.

The impact-modified poly(meth)acrylate B) to be used according to the invention can inter alia be obtained via known emulsion polymerization processes, which are described inter alia in Ullmann's Encyclopedia of Industrial Chemistry, Fifth Edition. For this process generally an aqueous phase is prepared which can comprise not only water but also conventional additives, in particular emulsifiers and protective colloids, to stabilize the emulsion.

The two- or multiphase emulsion polymer is produced in a conventional manner via two- or multistage emulsion polymerization in an aqueous phase. In the first stage, a tough phase is produced. Although known methods using a seed latex or using gradual addition of monomer can in principle be used, the properties desired according to the invention are best achieved via a process in which the entire monomer mixture for the tough phase is emulsified and polymerized.

The particle size of the tough phase depends inter alia on the concentration of the emulsifier. Particles whose average (weight-average) size is below 130 nm, preferably below 70 nm, and whose polydispersity is below 0.5, preferably below 0.2, are obtained at emulsifier concentrations of from 0.15 to 1.0% by weight, based on the aqueous phase. Smaller amounts of emulsifier give a larger average particle size, and larger amounts of emulsifier give higher polydispersity. The shorter the phase of particle formation at the start of the emulsion polymerization the lower the polydispersity—i.e. the greater the uniformity of particle size.

Formation of new particles after the start of the polymerization should especially be avoided, and subsequent addition of emulsifier can have this effect. The polymerization rate can also influence particle size and polydispersity of particle size; if the supply of free radicals is too small, polydispersity is too high, and if the supply of free radicals is too great the result can be excessive sensitivity to moisture—especially if peroxodisulphates are used to initiate the polymerization.

The emulsifier concentration mentioned is especially applicable to conventional anionic emulsifiers. Among these are, for example, alkoxylated and sulphated paraffins, and these are particularly preferred.

Examples of a polymerization initiator used are from 0.01 to 0.5% by weight of alkali metal peroxodisulphate or of ammonium peroxodisulphate, based on the aqueous phase, and the polymerization is initiated at temperatures of from 20 to 100° C. It is preferable to use redox systems, for example composed of from 0.01 to 0.05% by weight of organic hydroperoxides and from 0.05 to 0.15% by weight of Rongalit, at temperatures of from 20 to 80° C.

The selection of the correct polymerization conditions can be checked in an experimental batch, via measurement of average particle size and of the polydispersity of particle size, and if necessary altered in accordance with the abovementioned rules. Both of these variables can be calculated by known methods from the result of scattered-light measurement when the finished latex is subjected to ultracentrifuging.

Known means can be used to disperse the monomer-containing phase in the aqueous phase. Among these are in particular mechanical processes, and also use of ultrasound.

The emulsion polymer is produced in the form of an aqueous dispersion whose solids content is from 30 to 60% by weight and which generally comprises, based on solids, more than 0.05% by weight of water-soluble constituents. The water-soluble constituents can be removed from the emulsion polymer, if this is desired, by coagulating the dispersion, removing the liquid aqueous phase from the coagulate, and fusing the coagulate to give a moulding composition.

For these operations it is advantageous to use an extruder, in particular a twin-screw vented extruder. In this work-up method, the dispersion is pumped in liquid form into the extruder and coagulated at a temperature above the glass transition temperature of the emulsion polymer via simultaneous exposure to heat and shear forces. Because of the pressure prevailing in the extruder, the aqueous phase remains liquid even above 100° C., and is removed under pressure via a slot or a sieve plate in the extruder wall, together with the dissolved constituents. Suitable processes and apparatuses are disclosed by way of example in DE-A 27 50 682 and US-A 41 10 843. Any residual content of water can be evaporated in a known manner in a vent zone of the extruder.

The molten moulding composition is discharged from the extruder and pelletized, or moulded to give an extrudate with any desired profile, and cooled below the softening point (glass transition temperature).

The production of particularly preferred impact-modified poly(meth)acrylate B) is described in DE-A-38 42 796.

To produce a plastics mixture of the invention, a thermoplastic polyurethane A) can be compounded in a known manner with an impact-modified poly(meth)acrylate B). This process can by way of example take place in an extruder.

Preferred plastics mixtures of the present invention comprise from 10 to 60% by weight, particularly preferably from 15 to 40% by weight, of polyurethane A) and from 10 to 60% by weight, preferably from 15 to 30% by weight, of impact-modified poly(meth)acrylate B). The ratio by weight of polyurethane A) to impact-modified poly(meth)acrylate B) can preferably be in the range from 10:1 to 1:10, particularly preferably from 3:1 to 1:3.

A plastics mixture of the present invention can comprise not only a thermoplastic polyurethane A) and an impact-modified poly(meth)acrylate B) but also further polymers. Among these are in particular Poly(meth)acrylates, polystyrenes, polymers comprising acrylonitrile or maleic anhydride, polyacrylonitriles, polyethers, polyesters, polycarbonates, and also polyvinyl chlorides, particular preference being given to use of poly(meth)acrylates.

The weight-average molar mass $M_w$ of the homo- and/or copolymers which can optionally be present alongside the thermoplastic polyurethane and the impact-modified poly(meth)acrylate B) in the plastics mixture can vary widely, and the molar mass here is usually matched to the intended use and the mode of processing of the moulding composition. However, it is generally in the range from 20 000 to 1 000 000 g/mol, preferably from 50 000 to 500 000 g/mol and particularly preferably from 80 000 to 300 000 g/mol, with no intended resultant restriction.

As described above, for the purposes of the present invention a poly(meth)acrylate is a polymer obtainable via free-radical polymerization of (meth)acrylates. A poly(meth)acrylate C) which can be used optionally differs from the impact-modified poly(meth)acrylate B). Preferred poly(meth)acrylates C) comprise at least 40% by weight, particularly preferably at least 60% by weight and very particularly preferably at least 80% by weight, of repeat units derived from (meth)acrylates. A (poly)methacrylate C) can comprise not only the (meth)acrylates but also repeat units derived from comonomers. The amount generally used of these comonomers for the production of the poly(meth)acrylates C) is from 0 to 60% by weight, preferably from 0 to 40% by weight and particularly preferably from 0 to 20% by weight, based on the weight of the monomers, and the compounds here can be used individually or in the form of a mixture.

It is very particularly preferable to use polymethyl methacrylate (PMMA). These polymers comprise a high proportion of repeat units derived from methyl methacrylate. Mixtures for the production of polymethyl methacrylate generally comprise at least 50% by weight, preferably at least 80% by weight and particularly preferably at least 95% by weight, based on the weight of the monomers, of methyl methacrylate.

The weight-average molar mass $M_w$ of preferred (poly) methacrylates C), in particular of preferred polymethyl methacrylates, is in the range from 20 000 to 1 000 000 g/mol, preferably from 50 000 to 500 000 g/mol and particularly preferably from 80 000 to 300 000 g/mol.

According to one particular aspect of the present invention, the ratio by weight of impact-modified poly(meth)acrylate B) to poly(meth)acrylate C) can be in the range from 10:1 to 1:10.

The ratio by weight of polyurethane A) to poly(meth)acrylate C) can advantageously be in the range from 10:1 to 1:10.

The plastics mixtures of the present invention can comprise conventional additives. Among these are dyes, pigments, fillers, reinforcing fibres, lubricants, matting agents, UV stabilizers etc. Polymerizable UV absorbers can likewise be used to modify the properties of the plastics mixtures. These can by way of example be incorporated by polymerization into the emulsion polymer together with the other monomers during polymerization of the hard-phase monomers. These compounds can moreover also be used during the production of the poly(meth)acrylate C).

Surprising advantages are in particular possessed by plastics mixtures which comprise at least one UV absorber.

The plastics mixtures can moreover comprise matting agents. Among the preferred matting agents are in particular plastics particles.

Particularly preferred plastics mixtures are composed of from 10 to 40% by weight, particularly preferably from 15 to 30% by weight, of polyurethane A), from 0 to 40% by weight, particularly preferably from 15 to 30% by weight, of impact-modified poly(meth)acrylate B), from 40 to 80% by weight, particularly preferably from 50 to 70% by weight, of poly(meth)acrylate C) and from 0 to 30% by weight of additives.

The plastics mixtures of the present invention can be processed to give mouldings, such as films, with high transparencies. The transmittance of the plastics mixtures and, respectively, the mouldings obtainable therefrom can preferably be at least 50%, with preference at least 60% and with very particular preference at least 70%. Transmittance can be measured using D65 and 10° on a test specimen whose thickness is 3 mm (test standard: DIN 5033/5036).

The plastics mixtures moreover exhibit particularly little tendency towards cracking, and high resistance to crack propagation.

The present plastics mixtures can be used for the production of mouldings with excellent properties. Particularly preferred mouldings are foils. Foils of this type feature longlasting clarity, resistance to heat and cold, weathering resistance, low levels of yellowing and of embrittlement, and a low level of stress whitening on buckling or creasing, and are therefore suitable by way of example as windows in tarpaulins, in automobile roofs or in sails. These foils can moreover be used for the protective covering of keyboards, an in particular of laptop computers or of computer keyboards, to protect these from environmental effects, such as moisture. The thickness of these foils is often below 1 mm, for example from 0.05 to 0.5 mm.

Mouldings can also be coated with the plastics mixtures of the invention. One important application sector is the formation of thin surface layers of thickness, for example, from 0.05 to 0.5 mm on stiff, dimensionally stable substrates, such as sheet metal, paperboard, chipboard, plastics sheets and the like. In this case, the proportion of the tough phase can be substantially lower and the moulding composition can consequently be harder. There are various available processes for the production of such coverings. The moulding composition can, for example, be extruded to give a foil, and smoothed and laminated onto the substrate. An extrudate can be applied to the surface of the substrate by the extrusion coating technique, and smoothed by means of a roller. If a thermoplastic is used as the actual substrate, it is possible to coextrude the two compositions to form a surface layer composed of the clear moulding composition of the invention.

The plastic can moreover be used in 3D-moulding processes (membrane moulding presses; insert moulding). It is possible here to form even complex geometrical shapes at very low temperatures, without any unacceptable impairment of the properties of the plastic.

One particular application sector is provided in particular by mouldings used in winter sports. Skis or snowboards can in particular, for example, be coated with the plastics of the present invention, and foils can also be used for this purpose. Placards of any type, in particular information placards, traffic signs and number plates for motor vehicles, can moreover be coated with the plastics mixtures of the present invention, and foils can also be used for this purpose, these being applied to the said articles. Another application sector of interest for the present invention is coated transparent plastics sheets which can be used as a constituent of buildings, for example of greenhouses.

Blends of the impact-resistant moulding composition, in particular with polymethyl methacrylate, are suitable for the production of mouldings whose wall thickness is above 1 mm; for example for the production of extruded webs of thickness from 1 to 10 mm which can be stamped with good results and can be used by way of example for the production of printable panels for electrical devices, or for the production of high-quality injection mouldings, e.g. motor vehicle windows.

Examples and comparative examples will be used below for further explanation of the present invention.

COMPARATIVE EXAMPLE 1

A plastics mixture was produced, comprising 73% by weight of impact-modified polymethyl methacrylate (commercially available from Evonik Röhm GmbH with trade mark Plex® ZK 5HC) and 27% by weight of thermoplastic polyurethane (commercially available from Bayer AG with trade mark Desmopan®). The impact-modified polymethyl methacrylate does not correspond to Claim 1, mixtures of this type being known from EP-A-0 272 975.

This mixture was used to produce a foil via a chill-roll process. The extrusion system used for this purpose was composed of a single-screw extruder, a melt pump, a flat-film extrusion die with a discharge aperture of 240 mm×0.8 mm, a roller unit (L configuration), a lamination unit and a winder. At a distance of about 25 mm from the discharge aperture of the flat-film extrusion die there was a chill roll positioned centrally. The diameter of the roll was 100 mm and its width was 300 mm. The roughness Ra of the roll surface was <=0.003 μm, and Rmax was <0.25 μm, measured to DIN 4768. The temperature of the chill roll was set at from 100° C. to 130° C., preferably from 110° C. to 120° C. The temperature of the melt stream was about 240° C. The melt film approached the roll surface approximately tangentially and had about 90° wrap around the roll. After the film web had wrapped around the further subsequent cooling rollers, its thickness was determined via a traversing contactless measurement system, and electronically processed information was used to control the distribution of the melt over the width of the die, by means of a system of thermal expansion units. The foil was then laminated and wound up. The thickness of the resultant foil was about 150 μm.

To determine the mechanical properties, tear propagation force was measured. A value of 0.74 N in extrusion direction and a value of 1 N transversely with respect to extrusion direction were measured. Nominal tensile strain at break at room temperature, at −10° C. and at −30° C. was moreover determined, and the resultant values are shown in Table 1. Stress whitening tests were moreover carried out at room temperature, at −10° C. and at −30° C., and stress whitening was always found.

INVENTIVE EXAMPLE 1

Comparative Example 1 was in essence repeated, but an impact-modified polymethyl methacrylate according to Claim 1 was used, obtainable with trade mark Plex® 8943-F from Evonik Röhm GmbH. The tear propagation force for the foil produced via a chill-roll process from this mixture was 1.4 N in extrusion direction and 1.7 N transversely with respect to extrusion direction. Nominal tensile strain at break at room temperature, at −10° C. and at −30° C. was moreover determined, and the resultant values are shown in Table 1. Stress whitening tests were moreover carried out at room temperature, at −10° C. and at −30° C., and no stress whitening occurred.

COMPARATIVE EXAMPLE 2

Comparative Example 1 was in essence repeated, but production of the foil used a polishing process. The tear propagation force for the film produced was 0.65 N in extrusion direction. Nominal tensile strain at break at room temperature, at −10° C. and at −30° C. was moreover determined, and the resultant values are shown in Table 1. Stress whitening tests were moreover carried out at room temperature, at −10° C. and at −30° C., and stress whitening was always found.

INVENTIVE EXAMPLE 2

Inventive Example 1 was in essence repeated, but production of the foil used a polishing process. The tear propagation force for the film produced was 1.5 N in extrusion direction. Nominal tensile strain at break at room temperature, at −10° C. and at −30° C. was moreover determined, and the resultant values are shown in Table 1. Stress whitening tests were moreover carried out at room temperature, at −10° C. and at −30° C., and no stress whitening occurred.

TABLE 1

Results of tensile-strain-at-break tests (transversely with respect to extrusion direction)

|  | Room temperature | −10° C. | −30° C. |
| --- | --- | --- | --- |
| Comparative example 1 | 155.7 | 67.8 | 24.9 |
| Example 1 | 263.2 | 250.7 | 166.9 |
| Comparative example 2 | 139.4 | 48.5 | 27.3 |
| Example 2 | 222.3 | 228.1 | 130.1 |
| Results of tensile-strain-at-break tests (in extrusion direction) | | | |
| Comparative example 1 | 151.7 | 20.4 | 15.2 |
| Example 1 | 190.2 | 209.6 | 133.8 |
| Comparative example 2 | 77.4 | 35 | 14.4 |
| Example 2 | 110.9 | 104.1 | 52.5 |

The invention claimed is:

1. A plastic mixture comprising at least one thermoplastic polyurethane A) and at least one impact-modified poly(meth)acrylate B), wherein the impact-modified poly(meth)acrylate B) consists of a hard phase whose glass transition temperature is at least 70° C. and a tough phase whose glass transition temperature is at most −10° C., the weight-average particle size of the tough phase is at most 130 nm, and at least a portion of the tough phase has covalent linkage to the hard phase.

2. The plastic mixture according to claim 1, wherein the hard phase of the impact-modified poly(meth)acrylate B) comprises at least 80% by weight of repeat units derived from methyl methacrylate, based on the weight of the hard phase of the impact-modified poly(meth)acrylate B).

3. Previously Presented): The plastic mixture according to claim 1, wherein the tough phase of the impact-modified poly(meth)acrylate B) has at least 50% by weight of repeat units derived from an alkyl acrylate having from 1 to 6 carbon atoms, based on the weight of the tough phase of the impact-modified poly(meth)acrylate B).

4. The plastic mixture according to claim 1, wherein at least 15% by weight of the hard phase has covalent linkage to the tough phase.

5. The plastic mixture according to claim 1, wherein the ratio by weight of hard phase bonded covalently to the tough phase to tough phase of the impact-modified poly(meth)acrylate B) is at least 1:10.

6. The plastic mixture according to claim 1, wherein the average particle size of the tough phase is at most 70 nm.

7. The plastic mixture according to claim 1, wherein the impact-modified poly(meth)acrylate B) has at most 0.05% by weight of water-soluble constituents.

8. The plastic mixture according to claim 1, wherein the polyurethane A) comprises at most 10% by weight of repeat units which have aromatic groups.

9. The plastic mixture according to claim 1, wherein the ratio by weight of polyurethane A) to impact-modified poly(meth)acrylate B) is in the range from 10:1 to 1:10.

10. The plastics mixture according to claim 1, wherein the plastics mixture comprises a poly(meth)acrylate C) which differs from the impact-modified poly(meth)acrylate B).

11. The plastic mixture according to claim 10, wherein the ratio by weight of impact-modified poly(meth)acrylate B) to poly(meth)acrylate C) is in the range from 10:1 to 1:10.

12. The plastic mixture according to claim 10, wherein the ratio by weight of polyurethane A) to poly(meth)acrylate C) is in the range from 10:1 to 1:10.

13. The plastic mixture according to claim 1, further comprising at least one UV absorber.

14. The plastic mixture according to claim 1, further comprising at least one matting agent.

15. The plastic mixture according to claim 14, wherein the matting agent comprises plastics particles.

16. The plastic mixture according to claim 1, wherein the plastic mixture comprises from 10 to 60% by weight of polyurethane A) and from 10 to 60% by weight of impact-modified poly(meth)acrylate B).

17. The plastic mixture according to claim 16, wherein the plastic mixture is composed of from 10 to 40% by weight of polyurethane A), from 10 to 40% by weight of impact-modified poly(meth)acrylate B), from 40 to 80% by weight of poly(meth)acrylate C) and from 0 to 30% by weight of additives.

18. The plastic mixture according to claim 1, wherein the transmittance of the plastic mixture is at least 60%, measured using D65 and 10°, on a test specimen whose thickness is 3 mm.

19. The process for the production of a plastic mixture according to claim 1, wherein at least one thermoplastic polyurethane A) and at least one impact-modified poly(meth)acrylate B) are compounded.

20. A moulding comprising a plastic mixture according to claim 1.

21. The moulding according to claim 20, wherein the moulding is a foil.

22. A moulding comprising a coating comprising a plastic mixture according to claim 1.

* * * * *